(12) United States Patent
Banks et al.

(10) Patent No.: US 7,653,809 B2
(45) Date of Patent: Jan. 26, 2010

(54) METHOD AND SYSTEM FOR CONTROLLING THE ON-LINE SUPPLY OF DIGITAL PRODUCTS OR THE ACCESS TO ON-LINE SERVICES

(75) Inventors: David Murray Banks, Bristol (GB); David Everett Reynolds, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1575 days.

(21) Appl. No.: 10/240,302

(22) PCT Filed: Feb. 15, 2002

(86) PCT No.: PCT/GB02/00669

§ 371 (c)(1), (2), (4) Date: Sep. 30, 2002

(87) PCT Pub. No.: WO02/067158

PCT Pub. Date: Aug. 29, 2002

(65) Prior Publication Data

US 2003/0140225 A1 Jul. 24, 2003

(30) Foreign Application Priority Data

Feb. 17, 2001 (GB) ................................. 0103984.1

(51) Int. Cl.
*H04L 9/00* (2006.01)
(52) U.S. Cl. ........................ 713/155; 713/156; 713/157; 713/182; 705/74; 380/200
(58) Field of Classification Search ................. 713/182, 713/155–157; 705/74; 380/200
See application file for complete search history.

(56) References Cited

U.S. PATENT DOCUMENTS

| | | | | |
|---|---|---|---|---|
| 5,642,419 A | * | 6/1997 | Rosen | 705/76 |
| 5,815,665 A | * | 9/1998 | Teper et al. | 709/229 |
| 5,903,721 A | * | 5/1999 | Sixtus | 726/2 |
| 5,963,915 A | * | 10/1999 | Kirsch | 705/26 |
| 6,236,971 B1 | * | 5/2001 | Stefik et al. | 705/1 |
| 6,980,970 B2 | * | 12/2005 | Krueger et al. | 705/39 |
| 7,069,249 B2 | * | 6/2006 | Stolfo et al. | 705/74 |
| 2002/0004900 A1 | * | 1/2002 | Patel | 713/155 |
| 2002/0069174 A1 | * | 6/2002 | Fox et al. | 705/52 |

(Continued)

FOREIGN PATENT DOCUMENTS

WO WO00/14648 3/2000

(Continued)

*Primary Examiner*—Nasser G Moazzami
*Assistant Examiner*—Fikremariam Yalew (57) ABSTRACT

The invention is concerned with enabling substantially anonymous purchases of media products or other products (or access to an on-line service) to be made on-line. In order to initiate a purchasing session, consisting of one or more purchasing transactions, the purchaser authenticates himself to a home provider computer (3) which ten allots an anonymous client identifier (clientID) to the client for the purposes of that session. The purchaser (1) contacts a vendor computer (6), using the anonymous identifier (clientID) and an anonymising HTTP proxy, in order to place an order for one or more products or services for which the vendor computer has the right to authorize delivery. In order to obtain delivery of the product or service from the repository computer (5), the purchaser (1) provides the clientID to the repository computer (3).

25 Claims, 3 Drawing Sheets

U.S. PATENT DOCUMENTS

2003/0069857 A1 * 4/2003 Junda .......................... 705/74
2005/0033659 A1 * 2/2005 Zucker et al. ................. 705/26

FOREIGN PATENT DOCUMENTS

| WO | WO 00/14648 | * | 3/2000 |
| WO | WO00/65517 | | 11/2000 |
| WO | WO01/84906 A2 | | 11/2001 |
| WO | WO 00/14648 | * | 3/2002 |

* cited by examiner

METHOD AND SYSTEM FOR CONTROLLING THE ON-LINE SUPPLY OF DIGITAL PRODUCTS OR THE ACCESS TO ON-LINE SERVICES

This invention relates to a method and system for controlling the on-line supply of digital products or the access to on-line services.

The invention relates particularly, but not exclusively, to the on-line supply of media products.

For convenience, in this specification the terms 'vendor' and 'distributor' and their derivatives are used synonymously.

BACKGROUND TO THE INVENTION

Today, when you walk into a shop and purchase a physical CD (or any other media) it is possible to do that with reasonable anonymity. If you pay with cash, the vendor does not know who you are. If you pay by credit card, it would be possible for the vendor to track purchases made on that card, but that is generally not done. In any event, the credit card company (or your bank) does not learn exactly what product you have bought, and cannot track your usage of that product.

In a digital world, where products are delivered digitally (through downloading or streaming over the internet), the situation is somewhat different. Existing solutions (Adobe's PDF Merchant/WebBuy, IBM's Electronic Media Management System, Intertrust's MetaTrust Utility, Microsoft's Windows Media™ Rights Manager and Xerox's Content-Guard) all aim to maximise information collected about the individual, including purchase and usage information.

Recent high profile cases have highlighted how easy it is for on-line companies to assemble profiles of individuals. As an increasing amount of media is distributed over the internet, rather than physically, this problem will become worse.

SUMMARY OF THE INVENTION

This invention attempts to shift the balance of control back in favour of the consumer, by providing a means by which the consumer can make substantially anonymous purchases of digital products, or of access to on-line services, over the internet or other network.

In brief, the result of the purchase is a "Rights Certificate" that can be presented to any third party, demonstrating that certain rights over a particular product, such as a piece of media, or over an access to an on-line service, such as a personalised newspaper, have been afforded to the individual purchaser. This is preferably done in such a way that the identity of the individual is not disclosed to any party.

According to a first aspect of the invention there is provided a method of controlling supply of at least one of a digital product to, and access of a service by, a purchaser, from a repository computer which holds said digital product and hosts said service comprising the steps of:
  a) the purchaser authenticating himself over a communications link to an intermediary computer, in order to prepare for a purchasing session comprising at least one purchasing transaction for said at least one of said product and said service with a vendor computer which controls user rights in said product and said service,
  b) the intermediary computer assigning an anonymous client identifier to the purchaser for the purposes of this session, and supplying to the purchaser said anonymous client identifier,
  c) the purchaser submitting to the vendor computer over a communications link, a purchase order comprising a purchase request for said at least one of said product and said service, said anonymous client identifier, and an address of the intermediary computer (if this is not already known to the vendor computer),
  d) the vendor computer communicating with the intermediary computer to request authentication data for the purchasing transaction, by submitting said anonymous client identifier to the intermediary computer in order to identify the session, the home provider computer selecting authentication data for association in the intermediary computer with the transaction, and said intermediary computer supplying the authentication data to the vendor computer,
  e) the vendor computer creating a credential, the credential comprising data relating to identification data of the vendor, to identification data of said at least one of said product and said service and to the authentication data, and
  f) the vendor computer making the credential available for subsequent inspection by or on behalf of the repository computer.

Preferably the method further comprises the step of the vendor computer transmitting the credential to a certificate store for subsequent inspection by or on behalf of the repository computer.

Thus the invention in its first aspect is based on the notion of an ePerson—an online representation of an individual—that is hosted by an intermediary computer and what we call for convenience a 'Home Provider' service. A specific ePerson is identified within the home provider by a stable, persistent identifier, called the ePersonID. This, however, is never disclosed to the outside world. When an individual authenticates himself to the home provider in step (a) at the start of a session (conveniently by using conventional authentication schemes) he is allocated a random anonymous client identifier clientID for that session. Content vendors only see this anonymous client identifier, and so cannot easily track the individual from one session to the next, because the anonymous client identifier is preferably changed each session. The individual preferably uses an anonymising HTTP proxy in making the initial purchase request, so that the vendor is not able to link sessions based on the static address of the purchaser or on cookies.

Thus, the purchase process involves the vendor in step (e) creating a credential which preferably comprises a "Rights Certificate" which acts as a digital receipt for the purchase. The rights certificate includes the rights being afforded to the individual and an identifier for the content to which those rights refer.

A repository is provided by the one or more repository computers, and the repository may have an associated database.

Stable, persistent, identifiers are desirable to unambiguously identify each item of published content. URLs (Uniform Resource Locators) are accordingly not a good choice, since they depend on the location of the content. Consequently, some form of URN (Uniform Resource Name) scheme is needed, for example the CNRI (Corporation for National Research Initiatives) handle system. The content being purchased may be variable with time, for example a news service.

The rights certificate preferably also includes a chain of rights certificates on which the legitimacy of the rights certificate depends. These demonstrate, for example, that the vendor has the right to distribute this specific item of content. The chain of rights certificates may ultimately be rooted by the publisher of a media product publishing his public key in some "out-of-band way", such as in a well-known LDAP database, or in the handle system directly.

It will be appreciated that something was needed to be included in the right certificate that is bound to the identity of the individual. That is the reason behind the selection in step (d) of authentication data, desirably comprising a purchaser public key/private key pair. For this purpose, the home provider preferably maintains a large pool of public/private key pairs for each ePerson. The vendor can request one of the public keys to be selected at random, for inclusion in the certificate. Because the pool of public keys is large, it becomes hard to link together purchases bound to different public keys. Alternatively it would be possible, if such precautions are considered necessary by the purchaser, to generate a new key pair for each transaction undertaken.

The certificate is preferably then signed using the private key of the vendor, and deposited with a certificate store provider in step (f).

Later, when the individual wants to access the content (held in the third-party repository computer), the repository service contacts the certificate store computer to retrieve the certificate, and parses it to extract the individual's public key. The home provider is contacted to verify the identity of the purchaser. Preferably a challenge/response exchange takes place to demonstrate that the ePerson is in possession of the corresponding private key to the extracted public key.

The certificate is preferably arranged to specify a validity period for accessing of the product or service, usually by specifying an expiry date of the certificate.

A second aspect of the invention comprises a home provider computer configured to communicate with a purchaser and a vendor computer in accordance with the method of the first aspect of the invention.

The home provider service can also host certain other services associated with the individual, including:
1. A payment service—the individual trusts the home provider to hold his credit card details, and accumulate payments on his behalf.
2. A personal profile service—in the case where the individual trusts the home provider to maintain a personal profile, to support personalization of vendor sites. The individual may trust the home provider to release some portions only of the individual's profile as permitted by the individual's policy. In general the individual will be provided with beneficial terms by the home provider for permitting such release.

Although it is preferred that the home provider computer and the certificate store computer are separate entities, it is possible that these functions could be combined.

In general the purchaser will choose a home provider and a certificate store according to his requirements. However, it is possible that a content owner may specify a certificate store, the address of which would be published, preferably by the afore-mentioned handle system.

Preferably in step (b) the home provider supplies the purchaser with the address of the certificate store, and in step (c) the certificate store address is communicated to the vendor computer.

As presented so far, the system prevents the vendor tracking the individual's purchase patterns over a long period of time/across multiple sessions, but still places the home provider and certificate store provider in quite a powerful position. To minimise this possibility, we prefer to use one or more cryptographic transformations in the protocol that may assist in achieving the following:
1. The URN of the content being purchased is hidden from the home provider service, if this is desired by the individual, so that the home provider cannot track what content is being purchased. However, we prefer to provide the option that if desired by the individual, this can be relaxed, so that the home provider is allowed to maintain a list of "content that I own".
2. An index number for the certificate is generated in such a way that the certificate store cannot link together the certificates that are held by a specific individual. Preferably the process of cascaded hash functions is employed, which provides a way of indexing and retrieving certificates.
3. The certificates are stored in an encrypted form, so that the content store cannot easily gather usage information about either the individual (across content) or about a particular item of content (across users). Only the home provider can do this, and only if explicitly desired by the individual.

It will be appreciated that once a session is established, multiple transactions may occur over the session without needing to reauthenticate with the home provider. A transaction is either:
a) purchasing rights from a vendor, or
b) exercising rights with a repository.

A session is terminated when:
a) The user explicitly 'logs out' with the home provider, or
b) A predetermined number of transactions have been executed, or
c) A predetermined time period has expired.

Termination of a session involves the home provider removing the association between the clientID (that identifies the session) and the individuals stable ePersonID (or at least, tagging the clientID as invalid).

Ideally, on terminating a session the block of client state containing this clientID will be removed from the individual's browser (e.g. by deleting the cookies). This step is not absolutely essential, because if the user attempts to execute a transaction with an expired clientID, the transaction will fail and the user can be requested (by the repository or distributor) to re-authenticate with their home provider.

It is possible to combine the functions of some of the computer entities:
(i) The home provider computer and the certificate store may be combined in the circumstance that both are operated on behalf of the individual.
(ii) The repository computer and the vendor computer could be combined in the circumstance that they are both operated on behalf of the content owner.
(iii) Furthermore, it might in some circumstances be possible to combine the purchaser computer with the functions of the home provider computer and those of the certificate store computer.

The services which may be hosted by the repository computer are, for example, a stock quote service, a travel organisation service for purchasing flight tickets on reduced-price terms not generally available, or a personalised newspaper.

According to a second aspect of the invention there is provided an intermediary computer for use in controlling a transaction relating to a supply of at least one of a digital product to, and access to service by, a purchaser, the intermediary computer being adapted to communicate with a purchaser computer, a vendor computer and a repository computer, the vendor computer controlling rights in at least one of said product and said service, and the repository computer holding said product and hosting said service, said intermediary computer being adapted to assign an anonymous client identifier to the purchaser for the purposes of the transaction, and the intermediary computer being further adapted to select authentication data for association in the intermediary computer with the transaction, in use the intermediary computer being configured to transmit the anonymous client identifier to the purchaser computer, and said intermediary computer being further configured such that on receiving a signal representative of an authentication challenge from the repository computer said intermediary computer is operative to transmit a response signal which is generated using the authorisation data.

According to a third aspect of the invention there is provided a machine readable data carrier which when loaded onto a computer is operative to cause the computer to function in accordance with the intermediary computer of the second aspect of the invention.

The data carrier preferably comprises a magnetic or optical data storage device, for example a magnetic disc, tape, CD or DVD.

According to a fourth aspect of the invention there is provided a network for controlling supply of at least one of a digital product to, and access to a service by, a purchaser, the network comprising a purchaser computer, an intermediary computer, a vendor computer and a repository computer, the vendor computer controlling user rights in at least one of said product and said service, the repository computer holding said product and hosting said service, the arrangement of the network being such that, in use, the purchaser computer transmits an authenticating signal to the intermediary computer, the intermediary computer then supplying the purchaser computer with an anonymous client identifier, the purchaser computer submitting to the vendor computer, the purchase order comprising a purchase request for said at least one of said product and said service, and said anonymous client identifier, the vendor computer communicating with the intermediary computer to request authentication data for the purchasing transaction, by submitting said anonymous client identifier to the intermediary computer, the intermediary computer selecting authentication data for association in the intermediary computer with the transaction, and the intermediary computer supplying the authentication data to the vendor computer, the vendor computer creating a credential corresponding to said at least one of said product and said service of the purchase order, the credential providing evidence of the vendor's right to permit release of said at least one of said product and said service from the repository computer, and said credential incorporating said authentication data, and the vendor computer making the credential available for subsequent inspection by or on behalf of the repository computer.

DESCRIPTION OF PREFERRED EMBODIMENTS

Some embodiments of the invention will now be described, by way of example only, with reference to the accompanying Figures in which.

Figure 1:
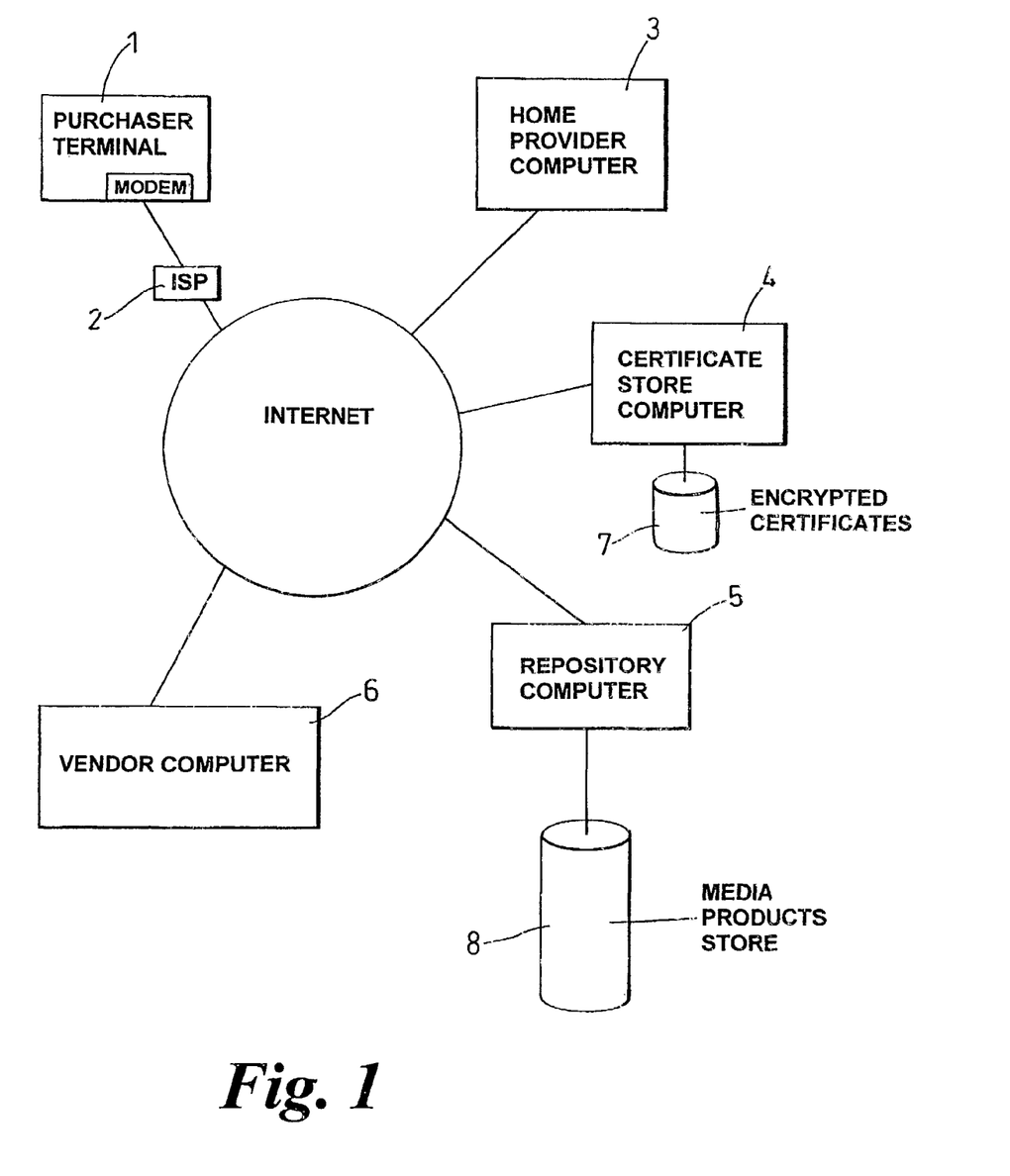
FIG. 1 is a schematic block diagram of a system for implementing the method in accordance with the invention.

In the system of FIG. 1 a purchaser terminal 1 can simply be a personal computer (PC), comprising CPU, RAM, ROM, non-volatile memory, keyboard and/or mouse, and a modem for connection, via an ISP (internet service provider) 2 to the internet. The purchaser terminal may, however, be for example a PDA (Personal Digital Assistant), an appliance or a telephone.

A home provider computer 3, certificate store computer 4, repository computer 5, and vendor computer 6 preferably all have dedicated connections to the internet. The computers 3, 4, 5 and 6 all contain a CPU, ROM and RAM and non-volatile memory. In addition the certificate store computer 4 has disc storage 7 for encrypted certificates, and the repository computer 5 has an associated large capacity store 8 for a range of media products such as music recordings.

Although the system of FIG. 1 will be described in relation to the supply of digital media products, it could be used in relation to other digital products, or to provide access to on-line services.

The entities 3, 4, 5, 6 need not be restricted to being implemented by single computer systems. A high throughput repository, for example, may comprise many computer systems operated as a cluster/web farm, but having the external appearance of a single system (i.e. a single address).

The repository and distributor systems will usually provide listings of the content they are able to supply/sell. Ideally these listings would be searchable, by title, author etc. So, instead of having to remember a potentially obscure URN, the user could simply enter 'war and peace' or 'tolstoy' into a search page. This is very much the way content portals appear today.

The search page would return a hyperlink that contained the URN of 'War and Peace', for example:

http://repository.hp.com/getContent.cgi?URN=ISBN0679600841

For books, it may be convenient to derive URNs from ISBN numbers. This is not, however, essential. Any unique naming scheme would suffice.

The user would click on the hyperlink to retrieve a copy of the content (assuming he already had bought the right to access it).

It may be that not all repositories are able to supply all content. Thus, the search portal described above may be run independently from a single repository computer and may span multiple repositories.

It will be appreciated that the units 1, 3, 4, 5 and 6 are all capable, in principle, of communicating with one another, but the manner of permitted communication is controlled by the system protocol.

The Details Of The Protocol

Figure 3:
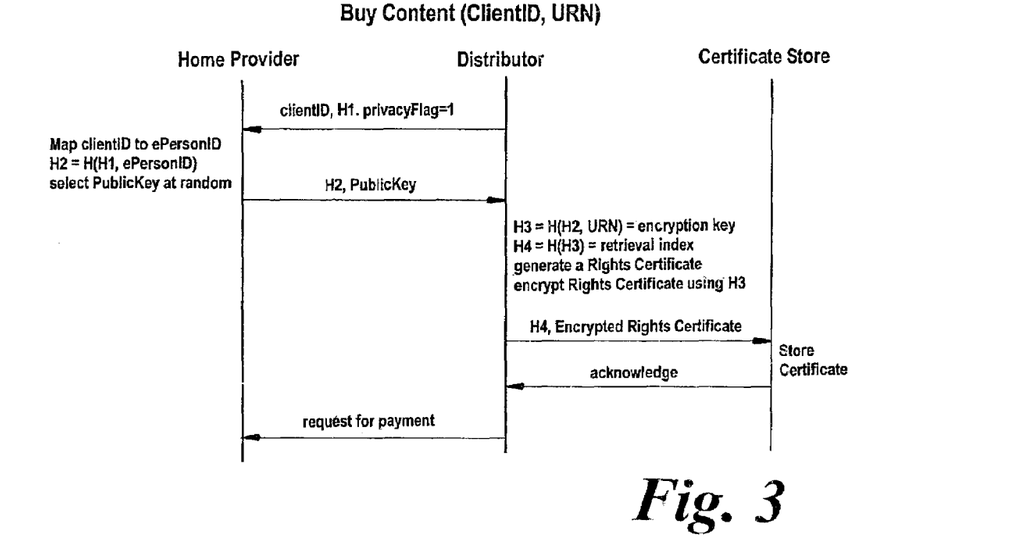
FIG. 3 shows the communication stages involved in issuing an encrypted rights certificate.
Figure 4:
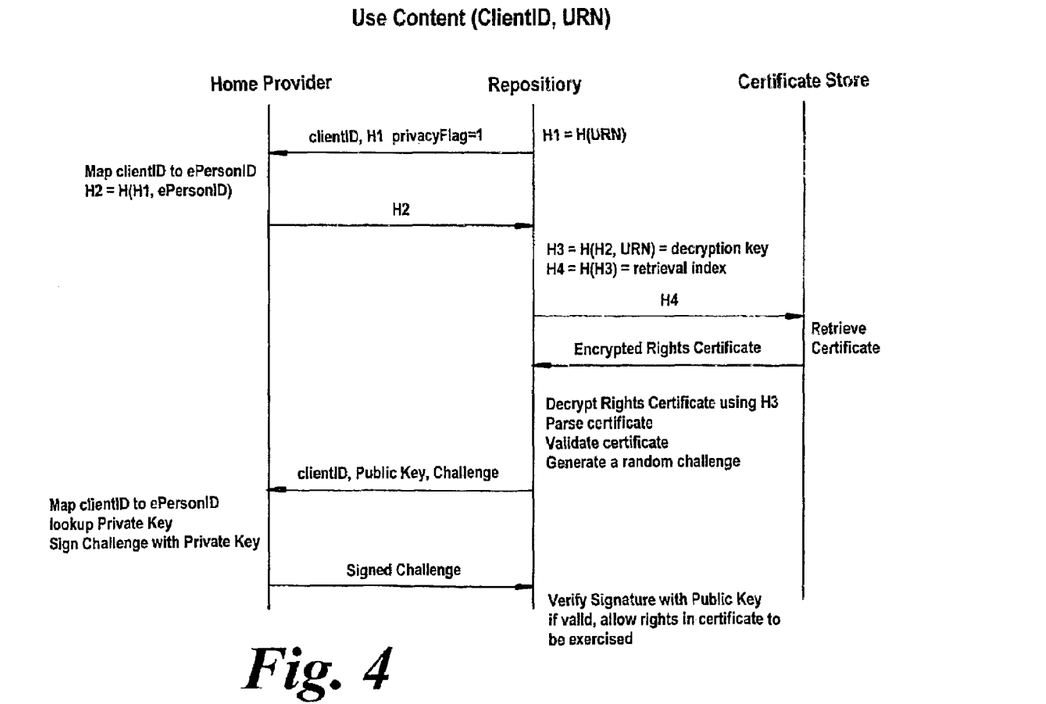
FIG. 4 shows the communication stages involved in examining the rights certificate to authorise release of the media product.

There are three stages: authentication at the start of a session, purchase of content (FIG. 3) and use of content (FIG. 4). The following logical roles are involved: the individual, a content distributor service, the home provider service, a content repository service and a certificate store service.

1. Authentication with the home provider at the start of the session:
  a) The individual uses conventional authentication (e.g. HTTP digest access authentication) to authenticate himself to the home provider, using (for example) a username and password established when he first registered with the home provider. This registration would typically have taken place over a secure (SSL) connection.
  b) The home provider chooses a large random number to use as a clientID and generates a block of client state (available to all parties) that includes the following items: the random clientID, the address (Ipaddress and port number) of the home provider service (homeProviderAddress), the address of the certificate store service (certificateStoreAddress), a boolean flag to indicate whether to reveal the content URN to the home provider (privacyFlag).

See hereafter for an example of how this client state may be implemented

2. Purchase of a new item of content from a vendor (distributor), resulting in an encrypted rights certificate being deposited with the certificate store:
   a) The distributor calculates H1=MD5Hash(URN) and passes the clientID, H1 and privacyFlag=1 to the home provider. (The MD5Hash function can be found in RFC 1321.) Alternatively (if the individual has chosen to allow the home provider to track his purchases), the distributor passes the clientID, URN and privacyFlag=0, and the home provider calculates H1=MD5Hash(URN).
   b) The home provider maps the clientID to a stable ePersonID. The home provider selects one of the public keys from the pool (at random), the home provider calculates H2=MD5Hash(H1, ePersonID), the home provider returns H2 and the chosen public key to the distributor. At this point the home provider may disclose additional information (with permission) such as user demographics, credit rating etc.
   c) The distributor generates and signs (using its own private key) the rights certificate (which includes the chosen individual's public key and any rights certificates on which it depends), the distributor calculates H3=MD5Hash(H2, URN)—this is the certificate encryption key, the distributor calculates H4=MD5Hash (H3)—this is the certificate index key, the distributor encrypts the certificate using H3, the distributor requests the encrypted certificate be stored in certificate store service, and it be indexed for retrieval by H4.
   d) The certificate store service stores the encrypted certificate with the index H4, and acknowledges this has been done.
   e) The distributor requests payment via the home provider, which completes the transaction.

Step (e) will be omitted in some cases when, for example, the content is funded by an advertisement or where an individual has revealed part of his profile in exchange for the content.

3. Use of the content (identified by a URN) involves the rights certificate being retrieved from the certificate store, decrypted, and the included identity validated with the home provider.
   a) The repository calculates H1=MD5Hash(URN) and passes Hi and the clientID to the home provider. Alternatively (if the individual has chosen to allow the home provider to track his exercising of rights), the repository passes the client ID, URN and privacy Flag=0, and the home provider calculates H1=MD5Hash(URN),
   b) The home provider maps the clientID to a stable ePersonID. The home provider calculates H2=MD5Hash (H1, ePersonID) and returns this to the repository,
   c) The repository calculates H3=MD5Hash(H2, URN)— this is the certificate decryption key, the repository calculates H4=MD5Hash(H3)—this is the certificate index key, the repository requests the encrypted certificate indexed by H4 from the certificate store,
   d) The certificate store retrieves the encrypted certificate indexed by H4 and returns it,
   e) The repository decrypts the certificate using H3, the repository parses the certificate to extract the URN (which it checks) and Public Key used. At this point any dependent certificates are checked. That is, the chained certificates are followed back until a certificate signed by the publisher's public or private key is found. The repository generates a random challenge, and passes the clientID, the Public Key and the challenge to the home provider,
   f) The home provider locates the corresponding private key, calculates a signature for the challenge, and returns this as a response,
   g) The repository validates the correct signature for the challenge has been return (using the public key) and, if so, any rights listed in the certificate may be exercised.

The current embodiment of the invention (a prototype) is implemented on an Apache web server using Java servlets. Many other implementations would be possible. DSA is used for all public/private key cryptography (since only signing is required, and DSA is more exportable than RSA). DES is used to encrypt the rights certificate prior to storage in the certificate store.

The client state (clientID, homeProviderAddress, certificateStore Address, privacyFlag) is established when the user authenticates himself at the start of a session. The current embodiment of the invention uses cookies, which is insecure and limits the all the logical services to be within the same domain (e.g. certificatestore.hp.com, homeprovider. hp.com, distributor.hp.com etc). A better implementation might enclose this information as extensions to an X.509 certificate, which could then be presented over an SSL connection. Further alternatives include embedding (in some standard way) in URLs or the establishment of a third-party service for the exchange of just this information between parties (using cookies).

An example format for a rights certificate, using XML, is shown below:

```
<Signature xmlns = "http://www.w3.org/2000/01/xmldsig/">
    <SignedInfo>
        <CanonicalizationMethod Algorithm = "http://www.w3.org/TR/1999/WD-xml-c14n-19991115"/>
        <SignatureMethod Algorithm = "http://www.w3.org/2000/01/xmldsig/dsa"/>
        <Reference IDREF = "Level2">
            <Transforms>
                <Transform Algorithm = "http://www.w3.org/TR/1999/WD-xml-c14n-19991115"/>
            </Transforms>
            <DigestMethod Algorithm = "http://www.w3.org/2000/01/xmldsig/sha1"/>
            <DigestValue
Encoding = "http://www.w3.org/2000/01/xmldsig/base64"> 3b9U9jDWHAFcY5QffxPoS94sXcg = </DigestValue>
        </Reference>
    </SignedInfo>
```

-continued

```
<SignatureValue> MCwCFFpJZkHmp1xnLEnBYxmtebDaa78gAhRG8DiprTUuy2fPfnAYUqRJfN71mA = = </SignatureValue>
    <dsig:Object Id = "Level2" xmlns = "" xmlns:dsig = "http://www.w3.org/2000/01/xmldsig/">
        <RightsCertificate>
            <Item>
                <RightsList>
                    <RightToUse>
                        <Delegatable />
                    </RightToUse>
                </RightsList>
                <WorkList>
                    <Work type = "URN" >hdl:Publisher1/fiction/abook </Work>
                </WorkList>
                <BeginDate>1 Jan 2000 </BeginDate>
                <EndDate>31 Dec 2099 </EndDate>
            </Item>
            <GrantDate>17 May 2000 </GrantDate>
            <Identity algorithm = "DSA" format = "X.509"
type = "KeyBased" >MIIBuDCCASwGByqGSM44BAEwggEfAoGBAPI/U4EddRIpUt9KnC7s5Of2EbdSPO9EAMMeP4C2USZpRV
1AIIH7WT2NWPq/xfW6MPbLm1Vs14E7gB00b/JmYLdrmVClpJ + f6AR7ECLCT7up1/63xhv4O1fnxqimFQ8E + 4P208UewwI1VB
NaFpEy9nXzrith1yrv8iIDGZ3RSAHHAhUA12BQjxUjC8yykrmCouuEC/BYHPUCgYEA9 + GghdabPd7LvKtcNrhXuXmUr7v6Ouq
C + VdMCz0HgmdRWVeOutRZT + ZxBxCBgLRJFnEj6EwoFhO3zwkyjMim4TwWeotUfI0o4KOuHiuzpnWRbqN/C/ohNWLx + 2J6
ASQ7zKTxvqhRkImog9/hWuWfBpKLZI6Ae1UIZAFMO/7PSSoDgYUAAoGBANLdSKetOBwhar5IIUTeWjmyUC9Gn6d5w6r4m +
d9Z1 + 5Qbs3Uo3de7IIHAp + OFPF + 32sA8irfTtqIIyzLDpnY3TSngxL5EnY2Q1JR8xq8YC93EldUL8DWL7PN275m + wScX5legUH
UGj812qX4vZA0WTtxvxLqHz + pLai4yTxgR8t </Identity>
            <DependentCertificate>
                <Signature xmlns = "http://www.w3.org/2000/01/xmldsig/">
                    <SignedInfo>
                        <CanonicalizationMethod Algorithm = "http://www.w3.org/TR/1999/WD-xml-c14n-19991115"/>
                        <SignatureMethod Algorithm = "http://www.w3.org/2000/01/xmldsig/dsa"/>
                        <Reference IDREF = "Level1">
                            <Transforms>
                                <Transform Algorithm = "http://www.w3.org/TR/1999/WD-xml-c14n-19991115"/>
                            </Transforms>
                            <DigestMethod Algorithm = "http://www.w3.org/2000/01/xmldsig/sha1"/>
                            <DigestValue
Encoding = "http://www.w3.org/2000/01/xmldsig/base64">BGO6tCQXGLj6mHYV1UWgh9/Vp1g = </DigestValue>
                        </Reference>
                    </SignedInfo>
<SignatureValue>MC0CFCmXMowmpOKW9VHrj4uXtUezOW6jAhUAjltqxWfgZEIUa8E57inq731xpEE = </SignatureValue>
                    <dsig:Object Id = "Level1" xmlns ="" xmlns:dsig = "http://www.w3.org/2000/01/xmldsig/">
                        <RightsCertificate>
                            <Item>
                                <RightsList>
                                    <RightToUse>
                                        <Delegatable />
                                    </RightToUse>
                                    <RightToDistribute>
                                        <NotDelegatable />
                                    </RightToDistribute>
                                </RightsList>
                                <WorkList>
                                    <Work type = "URN" >hdl:Pubilsher1/fiction/* </Work>
                                </WorkList>
                                <BeginDate>1 Jan 2000 </BeginDate>
                                <EndDate>31 Dec 2099 </EndDate>
                            </Item>
                            <GrantDate>16 May 2000 </GrantDate>
                            <Identity algorithm = "DSA" format = "X.509"
type = "KeyBased" >MIIBuDCCASwGByqGSM44BAEwggEfAoGBAP1/U4EddRIpUt9KnC7s5Of2EbdSPO9EAMMeP4C2USZpRV
IAIIH7WT2NWPq/xfW6MPbLmlVsl4E7gH00b/JmYLdrmVClpJ + f6AR7ECLCT7up1/63xhv4O1fnxqimFQ8E + 4P208UewwIIVB
NaFpEy9nXzrith1yrv8i1DGZ3RSAHHAhUA12BQjxUjC8yykrmCouuEC/BYHPUCgYEA9 + GghdabPd7LvKtcNrhXuXmUr7v6Ouq
C + VdMCz0HgmdRWVeOutRZT + ZxBxCBgLRJFnEj6EwoFhO3zwkyjMim4TwWeotUfI0o4KOuHiuzpnWRbqN/C/ohNWLx + 2J6
ASQ7zKTxvqhRkImog9/hWuWfBpKLZI6AeIUIZAFMO/7PSSoDgYUAAoGBAIfvKGyjZkFuG7NnpZzCuZp8COck7IRKyWflahqf
Uh5Hcr22AMzOxhhXH9yn + zPma1cqwymWufo03IXvuE9ww/8/i2DsObmX327XnxeR + UiRO6mhKieJM2uAgPbB/4gwa/9JUWIZ5
bMwbfz1HmVK9bmGTV6i7RoUhnPtBIM4Bx58 </Identity>
                        </RightsCertificate>
                    </dsig:Object>
                </Signature>
            </DependentCertificate>
        </RightsCertificate>
    </dsig:Object>
</Signature>
```

Figure 2:
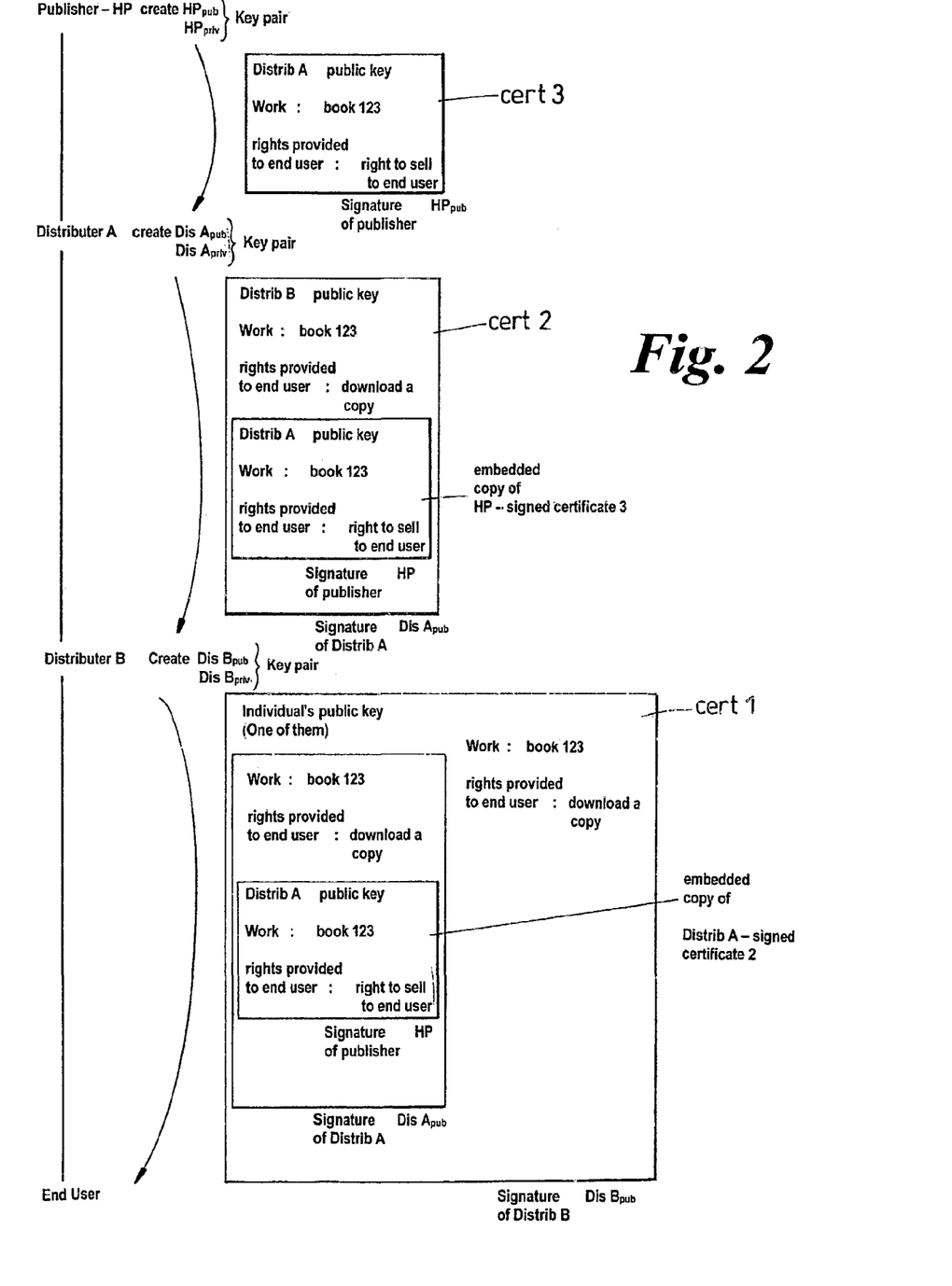
FIG. 2 shows the creation of nested certificates.

FIG. 2 schematically shows the creation of a composite rights certificate cert 1 which contains a nest of other rights certificates cert 2, cert 3 in a chain of rights passed from a publisher HP to an end user by way of distributor A and distributor B.

During subsequent inspection of a certificate it is important that the repository checks that the certificate was issued by a vendor who has (directly or indirectly) been authorised by the content owner to act as a distributor for this item of content. This requires the repository to check the signatures on the content certificate, and any nested certificates. An algorithm to achieve this is given below (it assumes a certificate has been retrieved).

```
URN = <the URN of the content being requested>
current_date = <the date and time the content is requested>
n = 1
failed = false;
while (certificate[n] exists && !failed) {
    if(certificate[n] contain a nested certificate) {
        extract public key "pub" from certificate[n + 1]
    else
        lookup public key "pub" in CNRI handle system using URN
        (for example)
    verify signature on certificate[n] using "pub".
    if verify failed, set failed = true
    /* check rights */
    if (n == 1)
        verify "right to use" exists within certificate[n]
        if verify failed, set failed = true
    else
        verify "right to distribute" exists within certificate[n]
        if verify failed, set failed = true
    /* check certificate for requested content */
    verify "work" within certificate[n] includes URN
    /* check expiry dates*/
    if (n == 1)
        extract grant_date from certificate[n]
        verify current_date between beginDate and endDate of
        certificate[n]
        if verify failed, set failed = true
    else
        verify grant_date between beginDate and endDate of
        certificate[n]
        if verify failed, set failed = true
    n = n + 1
    }
```

Note, the test for (n==1) checks whether this is the outer most Certificate.

The invention claimed is:

1. A method of controlling supply of at least one of a digital product to, and access of a service by, a purchaser, from a repository computer which holds said digital product and hosts said service comprising the steps of:
   a) the purchaser authenticating himself over a communications link to an intermediary computer, in order to prepare for a purchasing session with a vendor computer which controls user rights in said product and said service said purchasing session comprising at least one purchasing transaction for said at least one of said digital product,
   b) the intermediary computer assigning an anonymous client identifier to the purchaser for the purposes of this session, and supplying to the purchaser said anonymous client identifier,
   c) the purchaser submitting to the vendor computer over a communications link, a purchase order comprising a purchase request for said at least one of said product and said service, said anonymous client identifier, and an a network address of the intermediary computer),
   d) the vendor computer communicating with the intermediary computer to request authentication data for the purchasing transaction, by submitting said anonymous client identifier to the intermediary computer in order to identify the session, the intermediary computer selecting authentication data for association in the intermediary computer with the transaction, and said intermediary computer supplying the authentication data to the vendor computer,
   e) the vendor computer creating a credential, the credential comprising data relating to identification data of the vendor, data relating to identification data of said at least one of said product and said service and data relating to the authentication data, and f) the vendor computer making the credential available for subsequent inspection by or on behalf of the repository computer,
   f) the vendor computer making the credential available for subsequent inspection by or on behalf of the repository computer.

2. The method of claim 1 further comprising the step of the vendor computer transmitting the credential to a certificate store for subsequent inspection by or on behalf of the repository computer.

3. The method of claim 2 further comprising the steps of:
   g) the purchaser on wishing to access said at least one product and said service from the repository computer submitting his anonymous client identifier to the repository computer, the identity of said at least one of said product and said service, and the address of the intermediary computer,
   h) the repository computer communicating with the certificate store to locate the credential, and
   i) the repository computer extracting from the credential the authentication data contained in the credential, and submitting to the intermediary computer the authentication data obtained from said credential, to enable the repository computer to verify the identity of the purchaser in relation to user rights defined by said credential.

4. The method of claim 3 in which in step (i) verification of the identity of the purchaser is by way of a challenge and response procedure.

5. The method of claim 3 in which after step (g) the repository computer requests the intermediary computer to provide a retrieval index to the corresponding credential, based upon supply by the repository computer of the anonymous client identifier, and information on said at least one of said product and said service, the retrieval index then being used by the repository computer in step (h).

6. The method as claimed in claim 3 in which in step (g) the purchaser selects whether or not to permit disclosure of a portion of his profile to a third party.

7. The method of claim 2 in which in step (b) the intermediary computer supplies the purchaser with an address of the certificate store, and in step (c) the certificate store address is communicated to the vendor computer.

8. The method of claim 2 comprising a payment step in which the intermediary computer initiates a transfer of funds for which the purchaser is responsible to an account held by the vendor computer.

9. The method of claim 8 in which the payment step is made following receipt by the intermediary computer of a message from the vendor computer that the credential has been stored in the certificate store.

10. The method of claim 2 in which the credential created in step (e) is encrypted prior to step (f), whereby said credential is stored in an encrypted form in the certificate store.

11. The method of claim 10 in which the encrypted certificate is created by a process of cascaded hash functions, whereby certificates relating to different purchases of an individual are not associated in the certificate store.

12. The method of claim 2 in which the certificate store is combined with the intermediary computer.

13. The method of claim 12 in which the functions of the intermediary computer and certificate store are provided by the purchaser's computer, the communications link of step (a) being implemented by an internal function.

14. The method of claim 1 in which the credential comprises details of a right granted by a vendor to the purchaser in said at least one of said product and said service.

15. The method of claim 14 in which the credential provides evidence of the vendor's right to grant the right in said at least one of said product and said service to the purchaser.

16. The method of claim 14 or claim 15 in which the right granted by the vendor comprises a right to access said at least one of said product and said service from the repository computer.

17. The method of claim 1 in which during step (c) the purchaser uses an anonymising proxy in making the purchase request.

18. The method of claim 1 in which in step (d) selection of authentication data comprises selection of a public key/private key pair from a range of available public key/private key pairs previously allotted to the particular purchaser.

19. The method of claim 1 in which identity information of said at least one of said product and said service being purchased is made known to the intermediary computer only in encrypted form.

20. The method of claim 1 in which the communications links are provided by the internet.

21. The method of claim 1 in which access to a media product is purchased.

22. The method of claim 1 in which access to an on-line service is purchased.

23. The method as claimed in claim 1 in which in step (a) the purchaser selects whether or not to permit the intermediary computer subsequently to disclose a portion of the profile of the purchaser to a third party.

24. The method of claim 1 in which the credential is a digital certificate.

25. An intermediary computer that communicates with a purchaser and with a vendor computer in accordance with the method of claim 1.

* * * * *